July 26, 1960
H. V. HANSEN
2,946,490
COTTON CELL DROP ATTACHMENT FOR PLANTERS
Filed Dec. 31, 1956
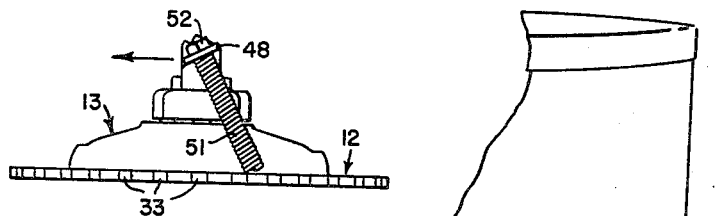
FIG. 4
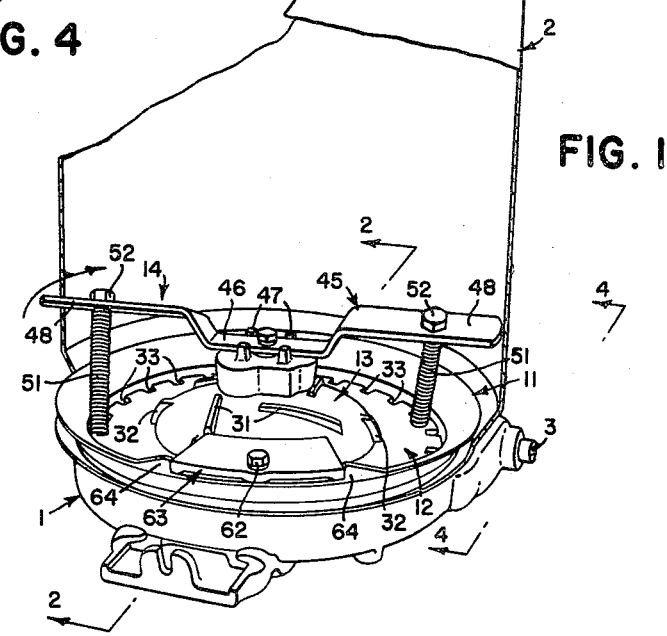
FIG. 1
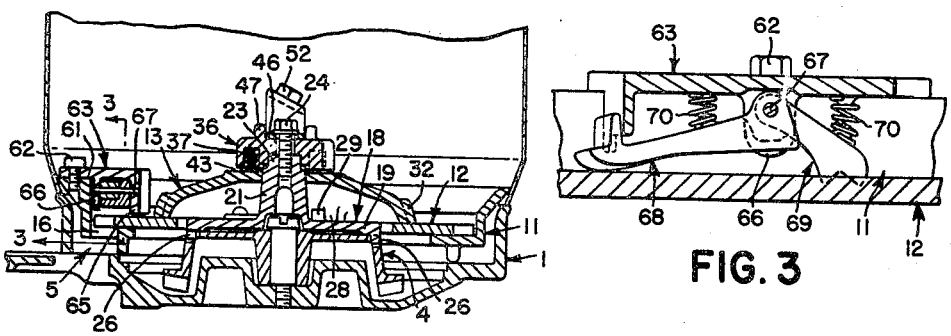
FIG. 2
FIG. 3
INVENTOR.
HAROLD V. HANSEN
BY
C.T. Parker  R.C. Johnson
ATTORNEYS United States Patent Office 2,946,490
Patented July 26, 1960

2,946,490

COTTON CELL DROP ATTACHMENT FOR PLANTERS

Harold V. Hansen, Hillsdale, Ill., assignor, by mesne assignments, to Deere & Company, a corporation of Delaware Filed Dec. 31, 1956, Ser. No. 631,954

10 Claims. (Cl. 222—227)

The present invention relates generally to agricultural implements, and more particularly to planters and the like.

The object and general nature of the present invention is the provision of a cotton planting attachment for planters, in which the attachment includes means for handling both gin-run and delinted cotton seed. More specifically, it is a feature of this invention to provide a cell drop cotton planting attachment in which means is provided for keeping the mass of cotton seed in a loose connection and, in addition, means is provided for urging the cotton seed into the cells of the seed plate. Further, it is a feature of this invention to provide a cell drop cotton planting attachment for existing cotton and corn planters whereby, with only a few changes, the attachment of the present invention may convert conventional planters into implements that can handle gin-run and delinted cotton seed and will plant one seed at a time.

These and other objects and advantages of the present invention will be apparent to those skilled in the art after a consideration of the following detailed description, taken in conjunction with the accompanying drawings, in which:

Fig. 1 is a perspective view, with certain parts broken away, showing the hopper of a conventional planter equipped with the cotton cell drop attachment of the present invention.

Fig. 2 is a central sectional view corresponding generally to a section taken along the line 2—2 of Fig. 1.

Fig. 3 is an enlarged fragmentary view taken generally along the line 3—3 of Fig. 2.

Fig. 4 is a view taken generally along the line 4—4 of Fig. 1 and illustrates the action of the agitating means.

The cell drop cotton planting attachment of the present invention is shown for purposes of illustration as incorporated in a planter having a base or hopper bottom 1 on which a hopper or seed container 2 is carried in any suitable way. The hopper bottom 1 is conventionally connected in detachable fashion to a supporting structure (not shown). The arrangement is generally similar to that shown in U.S. Patent 2,385,668, which issued September 25, 1945 to C. H. White and U.S. Patent 2,647,662, which issued August 4, 1953 to W. P. Oehler. The hopper 2 is pivotally mounted, by means not shown, whereby the hopper bottom 1 and associated parts may readily be accessible for changing seed plates and/or other mechanism associated therewith. The hopper bottom 1 is provided with suitable drive shaft means carrying a pinion which engages with the drive member 4 that normally forms a permanent part of the hopper bottom 1. The hopper bottom 1 also includes an opening 5 through which selected seed may fall downwardly through the seed passage of an associated planter shank.

According to the principles of the present invention, the cell drop cotton planting attachment includes an auxiliary hopper bottom ring 11, a seed selecting plate 12, a lower agitating member 13 and an upper agitating member 14, all disposable in the lower portion of the planter hopper 2 and carried by the associated hopper bottom thereof so as to be driven by the driving member 4. The auxiliary hopper bottom ring 11 comprises a member that is adapted to rest on the hopper bottom 1 and is provided with an opening 16 that is adapted to register with and be disposed generally directly above the opening 5 in the hopper bottom 1. The auxiliary hopper bottom ring or insert 11 is held in place relative to the planter hopper bottom 1 by any suitable means, such as a pair of bolts (not shown) which lie underneath the seed selecting plate 12.

The cell drop cotton planting attachment of the present invention also includes a center drive plate 18 that is best shown in Fig. 2. The center drive plate 18 comprises a lower plate section 19 and an upwardly extending post section 21, the end of which is squared, as shown at 23. The post 21 is also tapped to receive a fastening cap screw 24. The drive plate member 18 is provided on its lower side with a pair of depending lugs 26 that are adapted to engage suitable recesses in the planter drive member 4 whereby when the latter is rotated the drive plate member 18 is also rotated.

The lower agitating member 13 is mounted on the drive plate member 18 in drive transmitting relation, and any suitable means may be provided for driving the member 13 from the drive plate member 18. For example, lugs 28 are formed on the lower part of the member 13 and are located so as to engage upwardly extending lugs 29 on the drive plate member 18.

The lower agitating member 13 is in the nature of a crowned or concave-convex member, the upper surface being provided with ribs 31 that extend generally radially outwardly, and the peripheral portion of the member 13 is provided with radially extending lugs 32. These ribs and lugs act to shift material, such as cotton seed, lying adjacent and in contact with the member 13 generally laterally outwardly toward the peripheral portions of the seed selecting plate 12, which, as best shown in Fig. 1, is provided with seed receiving cells 33.

The lower agitator member 13, particularly the coating drive lug arrangement 28 and 29, is so constructed that the member 13 may move upwardly relative to the seed plate 12 while maintaining drive connection with the drive plate member 18. However, the lower agitator member 13 is yieldably held against such upward displacement by means of a cap member 36 that is recessed on its lower side to receive a number of small springs 37, there preferably being three springs, the lower ends of which bear against the upper central portion of the member 13. The central portion of the cap 36 is apertured to receive the cap screw 24, the latter thus fixing the cap member 36 to the upper end of the post section 21 of the drive member 18. The central portion of the cap member is squared so as to non-rotatably receive the squared portion 23 of the post section 21. Clearance 43 between the member 13 and the cap member 36 accommodates the desired amount of upward displacement of the member 13 relative to the seed selecting plate 12.

The upper agitator member 14 comprises a bar 45 having a central section 46 that fits in between a plurality of upwardly extending lugs 47 on the cap member 36, and the central portion is apertured to receive the cap screw 24. By virtue of this construction, the bar 45 is rotated within the lower portion of the hopper 2 in the direction indicated by the arrow in the lower left hand portion of Fig. 1 and moves with the seed plate 12 and the lower agitator member 13. The end portions 48 of the bar 45 are twisted so as to form sections that are disposed well above the lower agitator member 13, which sections are thus shaped so as to impart an upwardly directed component of force tending to move the material above the bar 45 generally upwardly. In this way, the mass of seed in the lower portion of the hopper is maintained in a relatively loose condition and packing of the mass of seed is thereby prevented.

The agitating and seed-stirring means as so far described includes the upwardly disposed twisted sections 48, which serve primarily to keep the mass of seed in the lower portion of the hopper in a loosened condition, and the lower agitator 13 which serves to shift seed from the generally central portion of the hopper radially outwardly so that they come into intimate contact with the radially outer portions of the seed plate 12, which portions carry seed cells 33 as mentioned above. The agitating means of the present invention is completed by the provision of spring members 51 that are carried in depending relation by the outer end portions of the bar 45. To this end, each twisted portion is apertured and receives a cap screw 52. The spring members 51 are in the form of coil springs the upper ends of which directly receive the threaded portions of the cap screws 52. The springs 51 are of such length that the lower ends ride substantially directly over the seed cells 33 and are angled, relative to the plane of rotation of the seed plate 12, in a generally backward direction so as to exert a component of force that tends to force or shift the individual seeds into the cells 33, as best shown in Fig. 4.

The auxiliary hopper bottom ring or insert 11 carries a flattened section 61 that is tapped to receive a cap screw 62 that secures a cut-off bracket 63 to the member 11. The bracket 63 is held in place relative to the member 11 by a pair of lugs 64 and includes a flange 65 that, together with a depending lug 66, is apertured to receive a pin 67 on which a cut-off 68 and a knocker 69 are swingably mounted. Springs 70 urge the knocker and cut-off downwardly into positions cooperating with the seed plate 12, the knocker 69 having a portion that is disposed substantially over the opening 16 in the hopper bottom ring member 11. The flange 65 of the bracket 63 extends downwardly into close relation with respect to the associated seed plate 12.

In operation, when the lower agitator member 13 and the upper agitating means 14 are rotated, as in the direction of the arrow shown in Fig. 1, the twisted end portions 48 of the agitating bar 45 act to lift masses of seed above the member 45, thus loosening the seed and insuring that the latter does not become packed too tightly in the lower portion of the hopper. At the same time, the depending spring members 51, inclined backwardly relative to the direction of rotation of the seed plate and other parts, act on the mass of seed below the bar 45 so as to urge the latter directly downwardly into the cells 33 of the seed plate 12. To this end, the springs 51 lie generally directly above in close proximity to the celled portion of the seed plate 12. Since the spring members 51 are quite flexible, each readily deflects as it passes around and over the cut-off bracket 63.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In an agricultural implement, a hopper carrying a distributing plate mounted for rotation in the bottom of the hopper and having peripheral cells, a first agitating means disposed in said hopper above said plate and having means spaced substantially directly above said cells and angled upwardly and rearwardly relative to the direction of movement so as to move material generally upwardly, thereby loosening material above the plate, and a second agitating means disposed substantially directly above said cells and angled downwardly and rearwardly relative to the direction of movement so as to direct material downwardly into said cells.

2. In an agricultural implement, a hopper carrying a distributing plate, an agitator mounted for rotation in the bottom of the hopper and having peripheral cells, a lower agitating member rotatable with said plate and having means acting to move material generally radially outwardly toward said cells, and an upper agitator also rotatable with said plate and angled downwardly and rearwardly relative to the direction of rotation so as to move material generally downwardly into said cells.

3. In an agricultural implement, an agitator comprising a bar rotatable in a generally vertical axis, said bar having opposite end portions, each twisted so as to act to shift material adjacent said end portion upwardly, and means depending from each of said end portions and acting to shift material below both of said end portions generally downwardly.

4. In an agricultural implement, an agitator comprising a bar having end portions twisted so as to act to shift material adjacent said end portions upwardly, and means depending from said end portions and acting to shift material below said bar generally downwardly, said bar being rotatable and said depending means including a pair of coil spring members, each fixed at its upper end to the associated end portion of said bar, the twist of the latter acting to dispose said spring member at backward angles relative to the plane of rotation of said bar.

5. In a planter including a hopper bottom having driven member, a cell drop cotton planting attachment comprising a drive plate attachable in driving relation to said driven member, a hopper bottom insert adapted to fit said planter hopper bottom and having an opening receiving said drive plate, a central post carried by said drive plate, a seed plate mounted in driving relation about said drive plate, a lower agitator member mounted over said seed plate and having means connectible in driving relation with said drive plate, a cap member attached to the upper end of said central post, spring means yieldably connected between said cap member and said lower agitator member and accommodating a limited amount of vertical displacement of the latter, an upper agitator bar carried by said cap member, and generally vertical agitator spring members connected at their upper ends to the end portions of said agitator bar and extending downwardly to points adjacent the outer portions of said seed plate.

6. In a planter including a hopper bottom having driven member, a cell drop cotton planting attachment comprising a drive plate attachable in driving relation to said driven member, a hopper bottom insert adapted to fit said planter hopper bottom and having an opening receiving said drive plate, cut-off means carried by said hopper bottom insert, a central post carried by said drive plate, a seed plate mounted in driving relation about said drive plate, agitating means rotatable with said seed plate and including an agitator bar adapted to loosen masses of seed lying above said drive plate and said seed plate, and generally vertically disposed agitator spring members connected at the upper ends to the end portion of said agitator bar and having sufficient resiliency and flexibility to be deflected when they pass over the cut-off means and to move generally downwardly to points closely adjacent said seed plate after they have passed said cut-off means.

7. In a planter including a hopper bottom having driven member, a cell drop cotton planting attachment comprising a drive plate attachable in driving relation to said driven member, a hopper bottom insert adapted to fit said planter hopper bottom and having an opening receiving said drive plate, a seed plate mounted in driving relation about said drive plate, cut-off means and knocker means carried by said hopper bottom insert and disposed over the peripheral portion of said seed plate, said cut-off means and said knocker means including a bracket attachable to said hopper bottom insert, and a cut-off and knocker pivoted at a common point to said bracket.

8. The invention set forth in claim 7, further characterized by said hopper bottom insert including an upwardly disposed flattened portion, means connecting said bracket to said flattened portion, said bracket including a depending flange and, spaced therefrom, a depending lug, said lug and flange being apertured, and a pivot member carried in said apertures and pivotally receiving said cut-off and knocker.

9. In a cotton planter, a hopper carrying a seed plate having peripheral cells, an agitator bar carried by said seed plate to rotate therewith and spaced above said plate, the ends of said agitator bar extending generally radially outwardly to points generally directly above said seed plate cells, and a generally downwardly disposed coil spring member fixed at its upper end to each end of said bar and acting to shift material below said bar generally downwardly into said cells.

10. In a planter including a hopper bottom having driven member, a cell drop cotton planting attachment comprising a drive plate attachable in driving relation to said driven member, a hopper bottom insert adapted to fit said planter hopper bottom and having an opening receiving said drive plate, a central post carried by said drive plate, a seed plate mounted in driving relation about said drive plate, a lower agitator member mounted over said seed plate and having means connectible in driving relation with said drive plate, a cap member attached to the upper end of said central post, an upper agitator bar carried by said cap member, and generally vertical agitator spring members connected at their upper ends to the end portions of said agitator bar and extending downwardly to points adjacent the outer portions of said seed plate.

References Cited in the file of this patent

UNITED STATES PATENTS

| | | |
|---|---|---|
| 1,282,648 | Smith | Oct. 22, 1918 |
| 1,302,922 | Heylman | May 6, 1919 |
| 2,551,853 | Schill | May 8, 1951 |
| 2,742,196 | Grether | Apr. 17, 1956 |
| 2,764,321 | Gerdes et al. | Sept. 25, 1956 |